United States Patent [19]
Parsels

[11] 3,915,337
[45] Oct. 28, 1975

[54] PRESSURE VESSEL WITH SHEAR STUD CLOSURE ASSEMBLY AND METHOD OF ASSEMBLING SAME

[75] Inventor: Donald I. Parsels, Morristown, N.J.
[73] Assignee: Foster Wheeler Energy Corporation, Livingston, N.J.
[22] Filed: Dec. 5, 1972
[21] Appl. No.: 312,425

[52] U.S. Cl. .................. 220/327; 29/447; 220/3; 220/378; 277/22
[51] Int. Cl... B65d 53/00; B65d 45/02; B23p 11/02
[58] Field of Search ......... 220/3, 46 R, 46 P, 55 A, 220/55 B, 55 R, 55 J, 55 Z, 55 F, 327, 378; 277/9, 22, 26; 29/447

[56] References Cited
UNITED STATES PATENTS

| | | | |
|---|---|---|---|
| 1,817,808 | 8/1931 | Eaton | 29/447 |
| 2,995,009 | 8/1961 | Rush | 220/46 R |
| 3,406,863 | 10/1968 | Wenzel et al. | 220/46 R |
| 3,451,585 | 6/1969 | Jorgensen | 220/46 R |

Primary Examiner—William I. Price
Assistant Examiner—Allan N. Shoap
Attorney, Agent, or Firm—John P. De Luca; Marvin A. Naigur; John E. Wilson

[57] ABSTRACT

A fluid container, such as a pressure vessel, in which a removable closure plug is adapted to sealingly close an open end of a cylindrical vessel. The closure plug is supported relative to the vessel in a manner so that a space is defined between respective surface portions thereof, with a sealing member being disposed in the space. Heat is applied to the vessel to cause movement thereof relative to the closure plug and a compression of said sealing member prior to the final attachment of the closure plug to the vessel.

7 Claims, 2 Drawing Figures

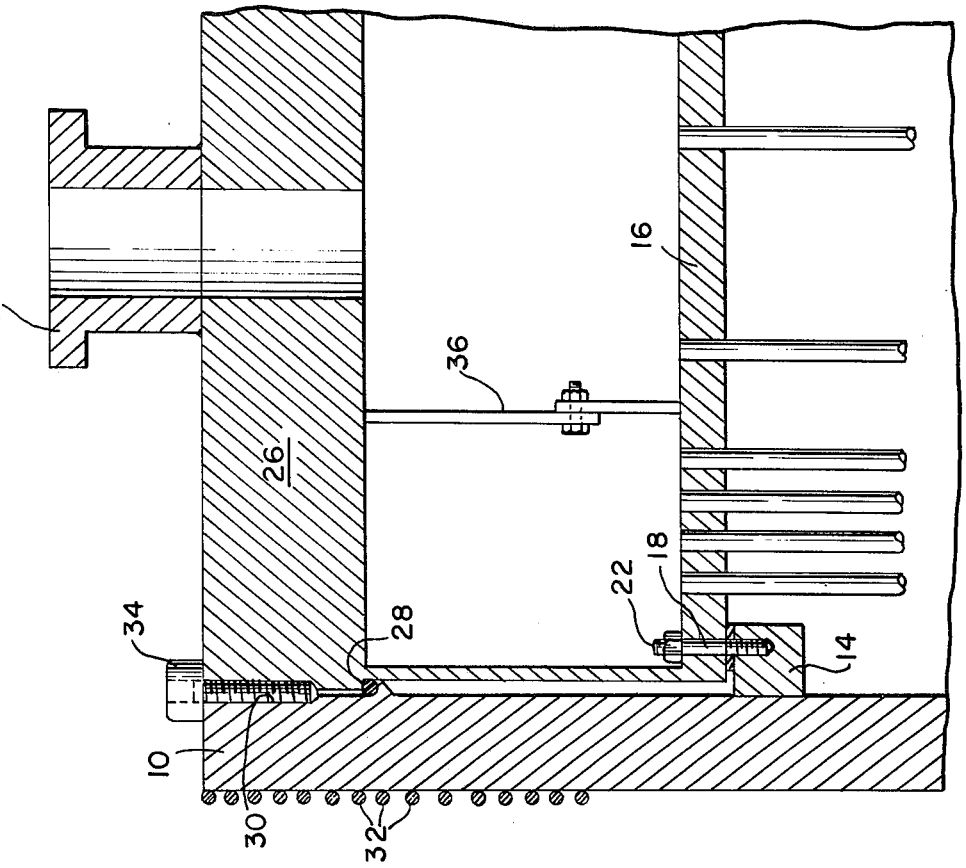
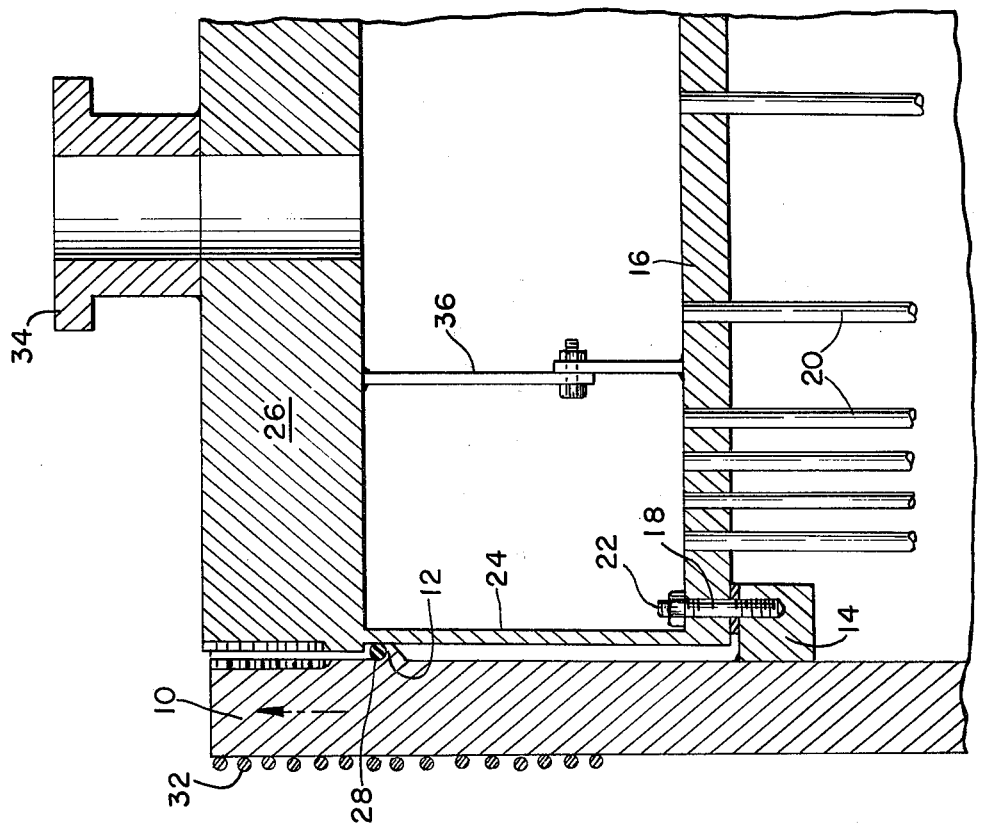

PRESSURE VESSEL WITH SHEAR STUD CLOSURE ASSEMBLY AND METHOD OF ASSEMBLING SAME

BACKGROUND OF THE INVENTION

This invention relates to a pressure vessel, and, more particularly, to a pressure vessel in which two adjoining vessel components are fixed together in an improved manner.

In process plants and other environments which require high pressure vessels, many of these vessels, such as reactors, converters, etc., require full size end openings having closures which are removable to permit insertion and withdrawal of internal material, equipment, etc.

Several proposals have been made to connect the closures and the shell members to each other. One of the most conventional arrangements utilizes a bolted flange unit with stud bolts attached to a flange at the end of a vessel shell. However, the disadvantages of these type arrangements are numerous. For example, the cost is disproportionally large compared with the total vessel cost, the handling of these units require special equipment, and the size of the complete vessel is unmanageable. Furthermore, the assembling and disassembling of the units is cumbersome and time consuming, as well as being impractical and uneconomical beyond certain limits of size and/or pressure.

Shear block and breech design have also been suggested, but their use is restricted due to high rotary and bending moments which occur with respect to a groove which is machined in a counterbore formed in one of the units. In order to attempt to overcome these moments, cooperating threads have been provided on the two units. However, in fairly large size vessels, severe machining difficulties are encountered in the threading due to the fact that the male and female threads are threaded from different type machines, and the small differences in thread pitch add up rapidly over a number of threads. This could result in most of the load being carried on a very few threads, thus causing very high stress concentration.

It has also been suggested to provide meshing projections on each of the units, and utilize a plurality of axially extending threaded shear members located in the interface between the meshing projections. However, in the use of a multi-layer vessel, the axially extending shear members are incapable of distributing the load across the entire vessel wall. Also, this arrangement is relatively expensive in material and cost, and, just as important, requires a relatively long time to assemble and remove the shear members from the cylinder.

Some of these disadvantages have been overcome in recent designs which employ a pressure vessel consisting of an open ended vessel member and a closure plug the outer surface of which defines an annular space with the inner wall of the vessel member. One or more sealing rings are disposed in the space and are compressed by a plurality of spaced shear studs which are inserted in corresponding tapped bores defined by the vessel member and the closure plug to provide a seal between the members. However, these arrangements necessitate an intricate preloading of the seal ring to permit insertion of the shear studs while the seal ring is preloaded, which increase the time and cost involved in the assembly.

SUMMARY OF THE INVENTION

It is, therefore, an object of the present invention to provide a pressure vessel which incorporates the advantages of the shear stud design discussed above, yet eliminates the necessity for inserting the shear studs while the pressure seal is preloaded.

Toward the fulfillment of this and other objects the pressure vessel of the present invention comprises a first container member having an open end, a second container member having at least a portion thereof extending into said open end, means supporting said second container member relative to said first container member in a manner so that a space is defined between respective surface portions of said members, sealing means disposed in said space and normally out of compression, and means to apply heat to one of said members to cause movement thereof relative to the other members and compression of said sealing means.

BRIEF DESCRIPTION OF THE DRAWINGS

FIG. 1 is a partial vertical cross-sectional view, depicting the pressure vessel of the present invention immediately prior to the final assembly thereof; and FIG. 2 is a view similar to FIG. 1 but showing the vessel of the present invention after it has been finally assembled.

DESCRIPTION OF THE PREFERRED EMBODIMENTS

Referring to FIG. 1 of the drawings which depicts the pressure vessel of the present invention prior to its final assembly step, the reference numeral 10 refers to the upper portion of an outer cylindrical shell of the vessel, the upper end of which is open as shown. A shoulder 12 is formed on the inner wall of the shell 10, near the upper end thereof, and a support ring 14 is welded to the inner wall of the shell 10 in a spaced relationship to the shoulder 12.

A tube sheet 16 extends within the shell 10 and rests on a sealing gasket 18 which is supported by the ring 14. The tube sheet 16 supports a bundle of tubes 20 which are utilized in a heat exchange function of the pressure vessel in a conventional manner which does not form any portion of the present invention.

A plurality of circularly spaced studs 22 (one of which is shown in FIG. 1) extend through holes provided through the tube sheet 16 and into corresponding tapped bores provided in the support ring 14 for fastening the tube sheet with respect to the shell 10.

A support cylinder 24 is connected to, or integral with, the upper surface of the tube sheet 16 and extends in a spaced relationship to the inner wall of the shell 10 to form an open annular channel therebetween.

A closure plug 26 is supported by the cylinder 24 and extends with the shell 10 to plug the open end thereof. In the initial stage of assembly, the upper surface of the closure plug 26 extends slightly above the upper surface of the end of the shell 10 as shown in FIG. 1 for reasons that will be explained in detail later. An annular sealing gasket 28 is supported by the shoulder 12 and, in the assembly stage of FIG. 1, is proximate to, but not in engagement with, a portion of the lower surface of the plug 26 extending outwardly from the support cylinder 24.

A plurality of tapped bores 30 (one of which is shown in FIG. 1) are defined by the inner wall of the shell 10 and the outer peripheral surface of the closure plug 16, and extend in a spaced relationship in a circle defined by the interface of the inner wall of the shell 10 and the outer surface of the closure plug 26. It is noted that the threads formed in the shell 10 are out of alignment with the threads formed in the plug 26 in the assembly stage of FIG. 1, for reasons that will be explained in detail later.

A heating unit 32 which may be in the form of electrical resistance coils is wrapped around the outer surface of the shell 10 at the upper portion thereof, as shown.

Other conventional details of an assembly of this type include a manhole 34 and a plurality of baffle assemblies 36 extending between the closure plug 26 and the tube sheet 16. Since these are of a conventional design, they will not be described in any further detail.

In assembly, the composite unit consisting of the closure plug 26, the support cylinder 24, and the tube sheet 16 supporting the tubes 20 are initially placed in the open end of the shell 10 whereby the tube sheet 16 rests on the gasket 18 supported by the support ring 14. The tube sheet 16 is then bolted to the support ring 14 by means of the studs 22 with the gasket 18 thus being compressed to provide an initial seal.

Heat is then applied to the electrical resistance coils of heating unit 32 which causes the upper portion of the shell 10 to undergo thermal expansion to an extent that it moves in a direction indicated by the arrow in FIG. 1 until its upper end becomes flush with the upper end of the closure plug 26 as shown in FIG. 2 and the threads forming the tapped bores 30 are aligned. This movement also compresses the gasket 28 extending between the shoulder 12 and the corresponding portion of the lower surface of the closure plug 26.

It can be appreciated that the size of the gasket can be selected so that an optimum precise predetermined compression can be applied to the gasket as a result of the foregoing. Then a plurality of shear studs 34 are threaded into the circularly spaced tapped bores 30, after which the electrical resistance heating is terminated and the shell 10 allowed to cool. The shear studs 34 will maintain the assembly in the position shown in FIG. 2, despite the tendency of the shell 10 to contract back to the position of FIG. 1 as a result of the cooling. Of course, the design can be such that the gasket 18 will obtain, and be maintained, in an optimum compressive state.

It is thus seen that the pressure vessel in the method of assembling the present invention eliminates the intricate preloading and machining operation of drilling and tapping the shear studs while preloaded yet provides all the advantages of the shear stud closure assembly.

Of course, other variations of the specific construction and arrangement of the shear stud closure assembly disclosed above can be made by those skilled in the art without departing from the invention as defined in the appended claims.

What is claimed is:

1. A fluid container comprising:
   a first container member having an open end and a shoulder having a surface facing outwardly of the opening,
   a second container member having at least a portion thereof extending into said open end, having an inwardly facing surface displaced axially away from said shoulder surface of the first member,
   means for supporting said second container member relative to said first container member in a manner so that a space is defined between the respective corresponding surface portions of said shoulder and inward surface of the second member,
   sealing means disposed in said space and normally out of compression,
   a plurality of tapered bores defined by said members along an interface defined between corresponding axial surfaces of the members, threads formed in one of said members normally being misaligned with corresponding threads of the other member forming each bore, and
   means to apply heat to the first member to cause movement thereof relative to the second member so as to align the bores and to effect compression of said sealing means as the first member expands on the application of heat such that the shoulder is axially displaced towards the inwardly facing surface of the second member.

2. The container of claim 1 further comprising means for attaching said heated one member to said other member to maintain said comprression after said heated one member cools.

3. The container of claim 2 wherein said attaching means comprises a plurality of threaded shear studs extending in said bores.

4. The container of claim 1 wherein said first container member is in the form of a pressure vessel, and said second container member is in the form of a closure for said vessel.

5. The container of claim 1 wherein said support means comprises a support ring connected to the inner wall of the first container member.

6. The container of claim 5 wherein corresponding bores located in the inner member and the support ring receive bolts for fixing the relationship of the innermost portion of the second member relative to the first member, whereas the open end of the first member may expand axially under the influence of the heating means and move relative to the inner member thereby causing the shoulder surface to compress the sealing member against the inwardly facing surface of the second member.

7. The container of claim 1 wherein said first and second members are cylindrical and said second member includes a cap member defining a portion of said threaded bores and a depending cylindrical member, the vessel includes a tube sheet connected to the depending cylindrical member having holes therein for receiving bolts fitted into corresponding holes in the support member for fixing the position of the inner portion of the second member relative to the first.

\* \* \* \* \*